United States Patent [19]

Army, Jr. et al.

[11] Patent Number: 5,634,964
[45] Date of Patent: Jun. 3, 1997

[54] AIR MIXER WITH WATER SEPARATOR

[75] Inventors: Donald E. Army, Jr., Springfield, Mass.; George E. Wilmot, Jr., East Granby, Conn.

[73] Assignee: United Technologies Corporation, Hartford, Conn.

[21] Appl. No.: 387,577

[22] Filed: Feb. 13, 1995

[51] Int. Cl.$^6$ .................................................. B01D 45/12
[52] U.S. Cl. .......................... 95/269; 55/297.4; 55/463; 55/452; 55/457; 95/272; 95/280
[58] Field of Search .................... 55/257.4, 463, 55/452, 457, 268; 95/269, 272, 280

[56] References Cited

U.S. PATENT DOCUMENTS

| | | | |
|---|---|---|---|
| 2,187,066 | 12/1940 | Youker | 62/285 |
| 2,400,617 | 3/1946 | Wheeler . | |
| 2,511,691 | 6/1950 | Bramley | 62/87 |
| 2,560,069 | 7/1951 | Bloomer | 55/463 |
| 2,560,075 | 7/1951 | Bloomer | 55/235 |
| 2,708,834 | 5/1955 | Dodge | 62/5 |
| 3,033,643 | 5/1962 | Janes | 55/257.4 X |
| 3,276,189 | 10/1966 | Sylvan | 55/230 |
| 3,339,349 | 9/1967 | Farnum | 55/309 |
| 3,347,027 | 10/1967 | Baker et al. . | |
| 3,360,077 | 12/1967 | Kopa | 55/257.4 X |
| 3,423,294 | 1/1969 | Sephton | 203/10 |
| 3,498,757 | 3/1970 | Allen | 95/269 X |
| 3,713,279 | 1/1973 | Moore | 55/319 |
| 3,733,786 | 5/1973 | Koka | 55/222 |
| 3,775,948 | 12/1973 | Beam | 55/238 |
| 3,792,572 | 2/1974 | Turbin | 55/269 |
| 4,076,508 | 2/1978 | Christensen | 55/463 X |
| 4,517,813 | 5/1985 | Eggebrecht et al. | 62/284 |

FOREIGN PATENT DOCUMENTS 0326950  9/1989  European Pat. Off. .

Primary Examiner—Robert J. Warden
Assistant Examiner—Krisanne M. Thornton
Attorney, Agent, or Firm—Donald S. Holland, Esq.; Holland & Bonzagni, P.C.

[57] ABSTRACT

An air mixer, with a water collector, is disclosed for supplying recirculated cabin air in aircraft. In the preferred embodiment: used cabin air flows over pipes of colder fresh air to cool the used air and condense out most of the moisture contained in it; the fresh air and used air are passed over opposite faces of a ring of stator vanes, thereby imparting swirls to both types of airstreams; and the streams meet at the trailing tips of the stator vanes, where they corkscrew together to throw remaining coalesced moisture against a collection trough, from where it is discharged. The airstreams can now be injected into the cabin without droplets raining down on the passengers, nor ice clogging any pipes for the fresh air, which is typically supplied at below-freezing temperature.

10 Claims, 3 Drawing Sheets

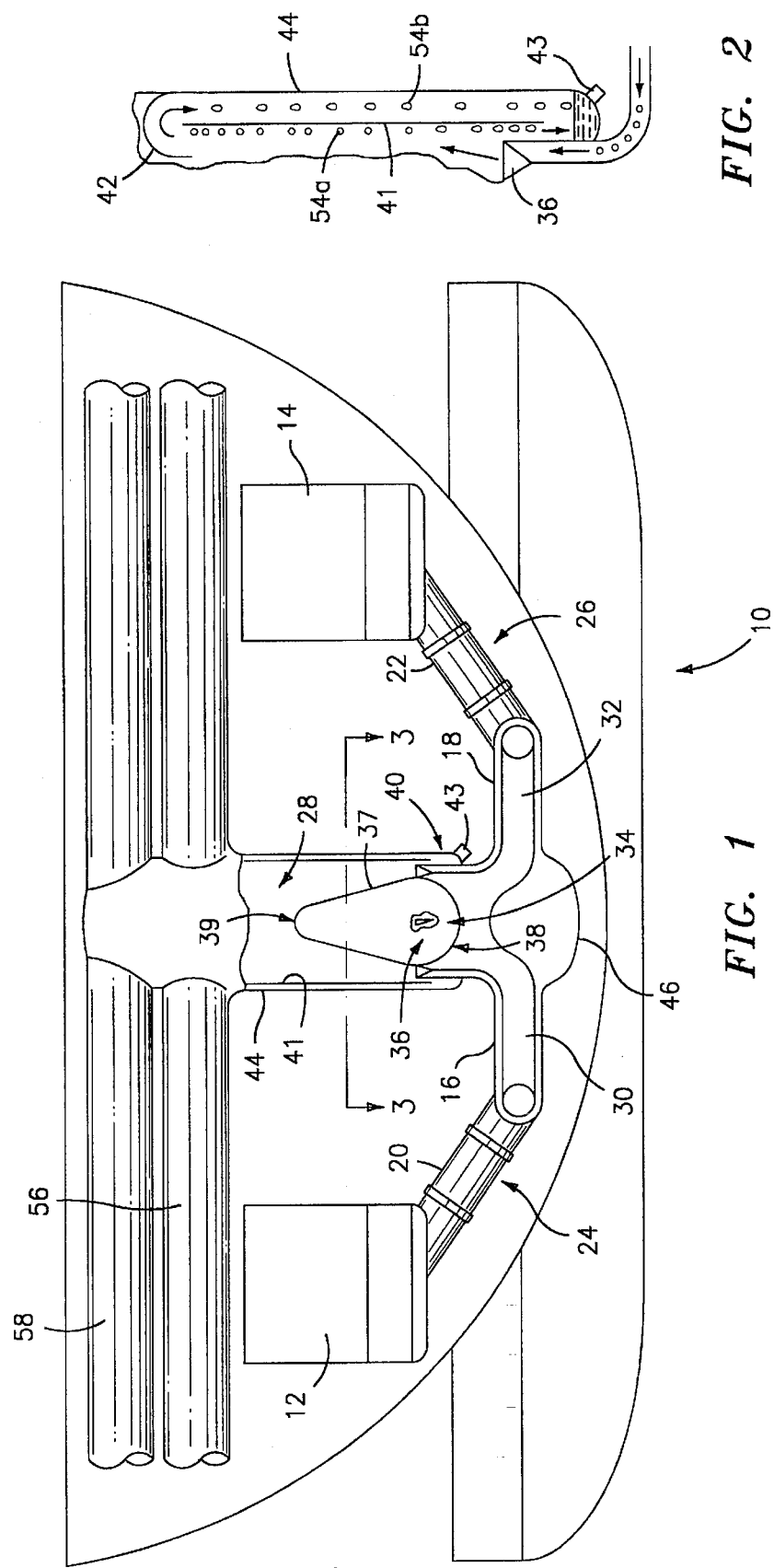

AIR MIXER WITH WATER SEPARATOR

BACKGROUND OF THE INVENTION

This invention relates to environmental control systems for supplying air to aircraft cabins.

A percentage (40%–50%) of cabin air is commonly recirculated in modern aircraft to conserve fuel consumption. Before "used" air can be reinjected into the cabin, it has to be filtered to remove contaminants and dehumidified to remove moisture. Also, "fresh" ambient air is mixed with the recirculated air to replenish the oxygen level and any lost volume.

To obtain cold fresh air, hot air is first bled from the gas turbine, off a compressor or fan stage. This hot air is then conditioned by running it through a "cool pack", such as Model No. EC300, manufactured by Hamilton Standard, a division of United Technologies Corporation.

The conditioned air, which is often below freezing, is then piped into a large plenum chamber, where it mixes with the warmer used air from the cabin. Because the used air is moisture-laden, it condenses upon being cooled in the mixing chamber. In addition, if there is a large-enough pressure drop in the plenum chamber, the fresh air (which is usually slightly pressurized) also gives up moisture. Unless this moisture is removed from the mixed airstreams, these particles would discharge into the cabin creating a foggy or misty atmosphere; or, on occasions, these particles could freeze into ice which would clog flow passages or be carried into the cabin. Therefore, water separators or dehumidifiers are typically added to prevent these conditions from happening.

Prior air mixers have drawbacks. For example, their inlet pipes with the freezing fresh air sometimes get blocked with ice upstream of the intended mixing; and, if mixing does occur in plenum chambers, the abrupt entwinement of different-temperature airstreams there is noisy. Also, their associated separators do not always remove sufficient moisture to prevent fogging.

Some effective separators tend to use stator vanes to impart a swirl to the moisture-laden fluid. This causes a centrifugal effect to throw entrained heavier particles (like water droplets or contaminants) against an interior wall, from where they are collected and removed.

However, they are typically used only with a single airstream (e.g., the recycled airstream), and are not used to mix or entwine two disparate airstreams, on opposite faces of the stator vanes, to create a thorough mixing through a cyclone effect that removes moisture from both streams. That would be a more effective dehumidifying system.

Accordingly, it is a principal object of the present invention to provide a unique air mixer and water collector, for supplying dehumidified air to aircraft cabins, that overcomes the aforementioned deficiencies of the prior art.

It is another general object to provide a highly efficient air mixer which is also capable of removing entrained moisture from the joined airstreams.

It is yet another general object to provide such a device which is smaller in diameter and generates less noise than present plenum-type mixers.

It is another object to provide an air mixer/water collector, commensurate with the above-listed objects, which has no moving parts and is extremely durable to use.

SUMMARY OF THE INVENTION

A unique air mixer, with a water collector, is disclosed for supplying recirculated (but replenished and rejuvenated) air to aircraft cabins. In the preferred embodiment, the used cabin air flows through ducts where it passes over a central cold source—namely, a pair of smaller-diameter pipes (within the ducts) that carry circulating fresh air, which was originally below freezing. The warm moist cabin air keeps the fresh air flowing within the pipes, by transferring heat to prevent an ice build-up, and it condenses somewhat in the process. After this initial condensation, the precipitated water drips by gravity into a collection trough; and the remaining recirculated used air flows over the outside of a ring of canted stator vanes and into a mixing chamber downstream. Meanwhile, the colder fresh air (from the central pipes) is discharged into the interior of the stator ring, whereupon that interior flow passes over the inside face of the stator vanes. The stator ring imparts a swirl to the recirculating airstreams and the colder fresh airstreams, on opposite faces of the vanes. At the tail ends of the vanes, the recirculating airstreams and the colder fresh airstreams meet, corkscrew together, and flow entwined outwardly toward the interior wall of the mixing chamber. This corkscrew effect quietly mixes the airstreams; and this cyclone effect throws any coalesced or remaining moisture in the recirculating air (and fresh air) against a deflector and/or gutter in the mixing chamber, from where it is collected and then removed. The dried airstreams can now be injected into the cabin without moisture raining down on the passengers.

BRIEF DESCRIPTION OF THE DRAWINGS

FIG. 1 shows a side view, with portions broken away, of an "Air Mixer with Water Collector" constructed in accordance with the present invention;

FIG. 2 is an enlarged view of an encircled portion of FIG. 1, showing portions of a deflector, gutter and collection trough;

DETAILED DESCRIPTION OF THE PREFERRED EMBODIMENT

Figure 3:
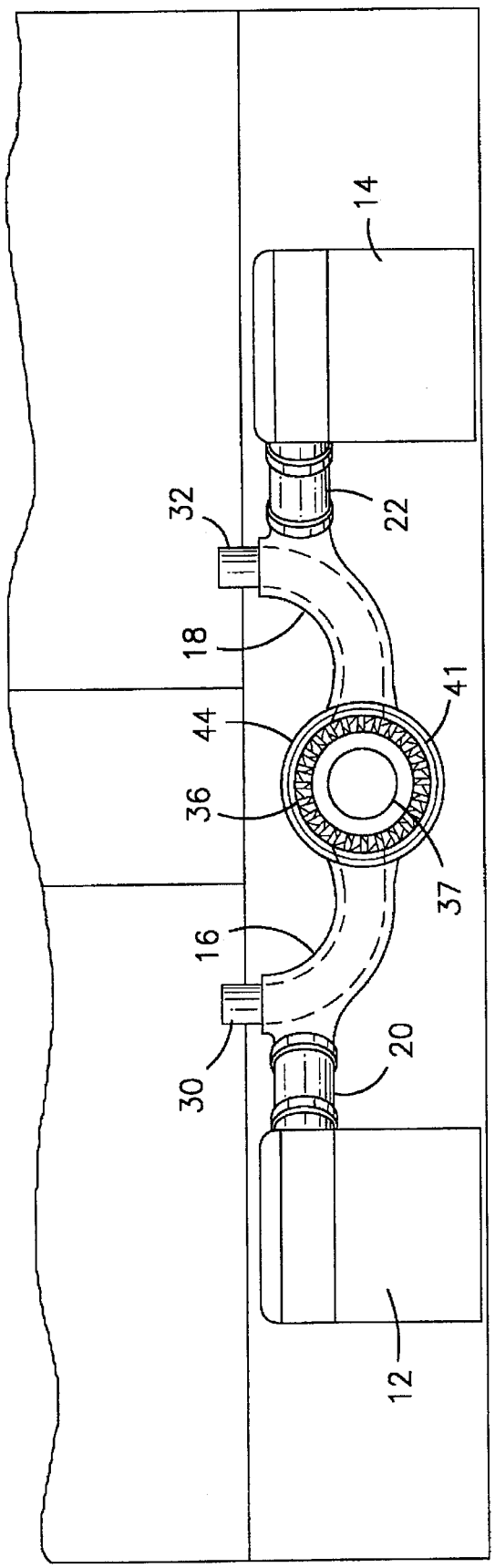
FIG. 3 is a plan view, taken along line 3—3 of FIG. 1, illustrating a central ring of stator vanes.

Referring to the drawings in detail, an air mixing system 10 (with an integral water separator) is disclosed for replenishing and dehumidifying recirculated air to aircraft cabins. It is intended to be marketed by Hamilton Standard.

In the preferred embodiment, the mixing system 10 comprises a pair of standard charcoal H.E.P.A. filters 12, 14 for removing contaminants from used cabin air received via suitable ducts (not shown). Respective elbow pipes 16, 18 are connected to these filters, via interconnecting pipes 20, 22 with flow-assisting fans (at 24, 26), for circulating the filtered air to a high-efficiency mixing chamber 28. Inside the elbow pipes 16, 18 are smaller-diameter cold-air ducts 30, 32. Ducts 30, 32 circulate fresh conditioned air, provided by any suitable means such as a bleed air cooling system (not shown), to the mixing chamber 28.

Downstream of elbow pipes 16, 18 is an inlet 34 to the air-mixing chamber 28. A ring 36 of stator vanes (preferably canted approximately 15°) is centrally mounted in the inlet, offset from the interior walls of the chamber. The elbow pipes 16, 18 (and interior cold-air ducts 30, 32) terminate at the inlet (see FIG. 1); and the ring is attached to them. There, the cold-air ducts discharge their fresh air within the stator ring 36; and the elbow pipes 16, 18 discharge the recirculated air over the outside of the ring.

A center body 37, in the shape of an ice cream cone, is attached to the inside of the stator ring 36 by any suitable means, such as struts (not shown). It has a bulbous end 38 that starts upstream of the stator ring and a tail end 39 that extends beyond the vanes, into the mix chamber. This bulbous end acts as a flow guide to direct the fresh air discharged from the cold-air ducts 30, 32 against the inside of the stator vanes.

Mixing chamber 28 includes an annular water collection trough 40 that extends upstream of the inlet 34 (see FIG. 1). It has an annular gutter 41 (with associated deflector 42) that overlies the stator ring 36 and extends downstream, within the mixing chamber's main body 44. The chamber 28 is in fluid communication with the collection trough 40 (see FIG. 2), which has a drain port 43 for dumping collected water overboard.

Below the mixing chamber 28—before the cold-air ducts 30, 32 turn upwardly in FIG. 1—is a concave drip collector 46, or lower trough. This collector is located in a bottom portion of elbow pipes 16, 18. It is an independent chamber separate from the upper collection trough 40. Like the upper collector though, it too contains a drain port (not shown) for dumping precipitated water overboard.

In operation, the high-efficiency mixer/collector 10 preferably functions as follows. Conditioned fresh air (below freezing) enters the cold ducts 30, 32 and makes a 90° turn into mixing chamber 28. As soon as the cold-air ducts penetrate the elbow pipes 16, 18, they are enveloped by warm moist recirculating air to prevent ice formation on the interior of the cold ducts. In addition, most of the moisture contained in the warm recirculating air will condense out when it comes in contact with the cold-air ducts. The resulting condensate drips into lower trough 46 or is carried further downstream to be collected and removed.

Figure 4:
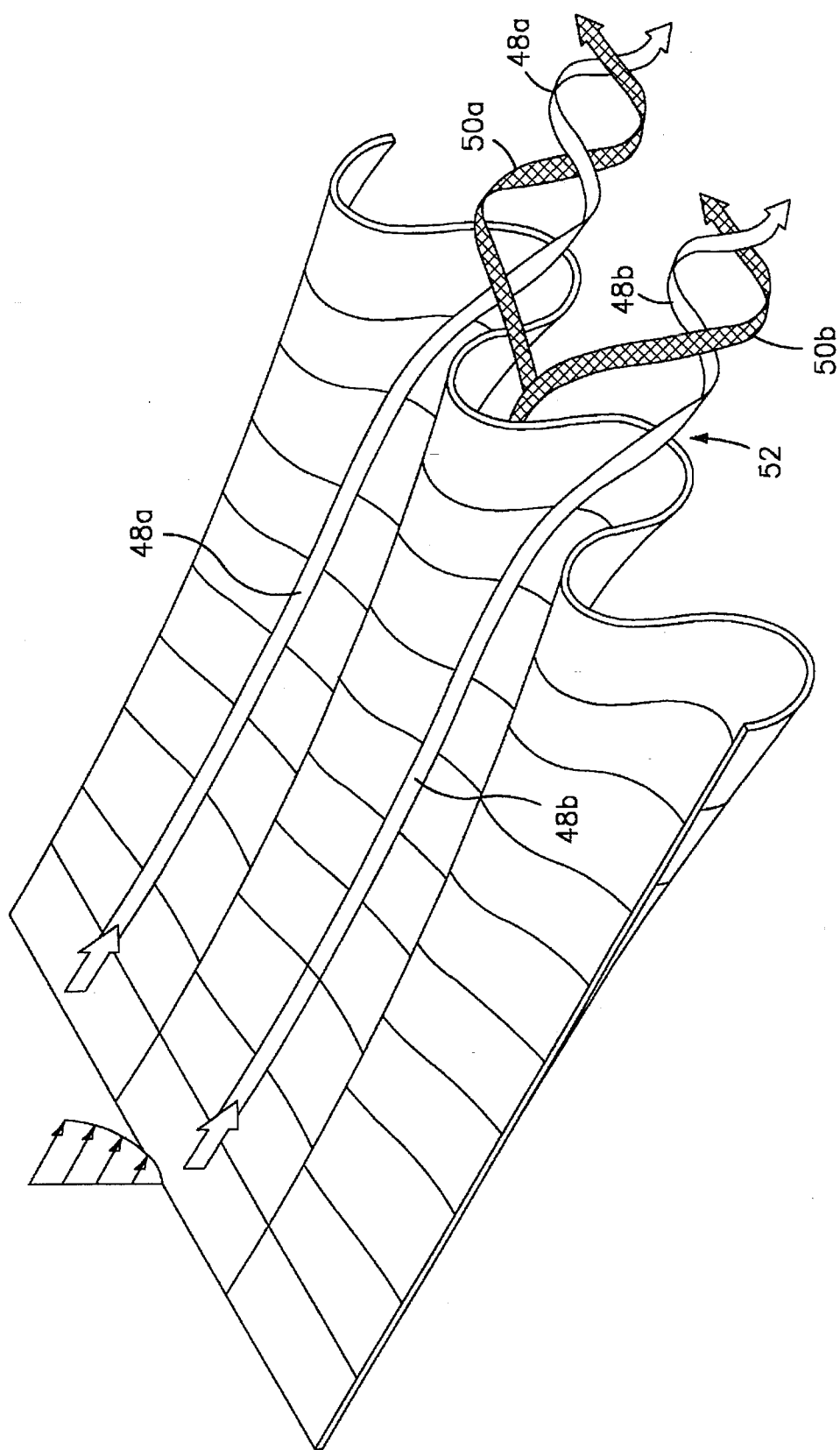
FIG. 4 depicts two airstreams flowing over opposite faces of the stator vanes and mixing together, in a corkscrew manner, at the tips of the vanes.

At this point, warm and cold airstreams enter the inlet 34 of mixing chamber 28. The warm airstreams (represented by arrows 48a,b in FIG. 4) flow over the outside of stator ring 36, while the colder fresh airstreams (represented by arrows 50a,b in FIG. 4) pass over the inside face of the stator ring. The stator vanes impart swirls to the recirculating airstreams 48a,b and the colder fresh airstreams 50a,b, on opposite faces of the vanes. At the tail ends of the vanes (at 52), the recirculating airstreams and the colder fresh airstreams meet, corkscrew together, and flow entwined outwardly (due to the canting of the vanes) toward the gutter 41 of the mixing chamber. This cyclone effect causes any coalesced or remaining moisture in the recirculating air (and fresh air) to be centrifuged and thrown against the gutter and/or deflector 42. From there, droplets (e.g., 54a,b) drop into the water collection trough 40 along both sides of the deflector (see FIG. 2). The dry mixed air then enters the airstream distribution system through manifold outlet ducts 56, 58.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. In an environmental control system for supplying air to aircraft cabins, having duct work for recycling used cabin air, in which conditioned fresh air is mixed with recycled, warmer used cabin air in a mixing chamber having an inlet and outlet, the improvement comprising:

a. cold-air duct means to direct the conditioned air toward the mixing chamber;

b. warm-air duct means to direct the warmer used cabin air, initially laden with moisture, over the cold-air ducts and toward the mixing chamber to warm the conditioned air and thereby prevent the conditioned air from icing up within the cold-air duct means, whereupon the warmer used cabin air cools and a substantial portion of the moisture from the used cabin air condenses and precipitates as water droplets;

c. collection means, adjacent the cold-air and warm-air duct means, to collect and remove the precipitated water;

d. a ring of canted stator vanes, centrally mounted within the inlet of the mixing chamber, adjacent discharge ends of the cold-air duct means and the warm-air duct means;

e. first directing means to direct the conditioned fresh air, as the conditioned air discharges from the cold-air duct means, over an outside face of the stator vanes;

f. second directing means to direct the warmer used air, as the warmer air discharges from the warm-air duct means, over an inside face of the stator vanes;

whereby fresh and used airstreams meet at tail ends of the vanes, corkscrew together and flow outwardly toward interior walls of the mixing chamber, creating a cyclone effect that throws remaining coalesced moisture in the airstreams toward an interior wall of the mixing chamber;

g. second collection means formed in part by the interior walls of the mixing chamber for collecting and removing moisture from the chamber; and h. manifold means to direct the now dehumidified, joined airstreams onto the cabin.

2. The apparatus of claim 1 wherein the mixing chamber includes an annular gutter that overlies the ring of stator vanes and catches moisture thrown toward the interior wall of the chamber.

3. The apparatus of claim 2 wherein the mixing chamber includes an annular deflector, mounted centrally within the chamber and spaced apart from the chamber's interior wall, whereby the deflector is located upstream of the gutter and deflects moisture into the gutter and into the second collection means.

4. In an environmental control system for supplying air to aircraft cabins, having duct work for recycling used cabin air, in which conditioned fresh air is mixed with recycled, warmer used cabin air in a mixing chamber having an inlet and an outlet, the improvement comprising:

a. cold-air duct means to direct the conditioned air toward the mixing chamber;

b. warm-air duct means to direct the warmer used cabin air, initially laden with moisture, over the cold-air ducts and toward the mixing chamber to warm the conditioned air and thereby prevent the conditioned air from icing up within the cold-air duct means, whereupon the warmer used cabin air cools and a substantial portion of the moisture from the used cabin air condenses and precipitates as water droplets;

c. collection means, adjacent the cold-air and warm-air duct means, to collect and remove the precipitated water;

d. a ring of canted stator vanes, mounted within the mixing chamber, adjacent discharge ends of the cold-air duct means and the warm-air duct means, whereby the conditioned fresh air is directed over an outside face of the stator vanes, as the conditioned air discharges from the cold-air duct means, and the used cabin air is directed over an inside face of the stator vanes, as the used air discharges from the warm-air duct means, whereby fresh and used airstreams meet at tail ends of the vanes, corkscrew together and flow outwardly toward the interior walls of the mixing chamber, creating a cyclone effect that throws remaining coalesced moisture in the airstreams toward an interior wall of the mixing chamber;

e. second collection means formed in part by the interior walls of the mixing chamber for collecting and removing moisture from the chamber; and f. manifold means to direct the now dehumidified, joined airstreams onto the cabin.

5. The apparatus of claim 4 wherein the ring of stator vanes is centrally mounted within an inlet of the mixing chamber.

6. The apparatus of claim 5 wherein the mixing chamber includes an annular gutter that overlies the ring of stator vanes and catches moisture thrown toward the interior wall of the chamber.

7. The apparatus of claim 6 wherein the mixing chamber includes an annular deflector, mounted centrally within the chamber and spaced apart from the chamber's interior wall, whereby the deflector is located upstream of the gutter and deflects moisture into the gutter and into the second collection means.

8. A method of supplying dehumidified air to aircraft cabins, said method comprising:

a. circulating conditioned fresh air inside cold-air ducts toward a mixing chamber;

b. enveloping the cold-air ducts with warmer moisture-laden used air, received from the aircraft cabin, that also flows toward the mixing chamber, whereby the warmer air prevents the conditioned air from icing up within the cold-air ducts and thereby keeps the conditioned air flowing therein, and the conditioned air causes an initial substantial portion of the moisture in the warmer moisture laden air to condense out and precipitate as water droplets;

c. collecting and removing the initial condensation;

d. directing the fresh and used airstreams downstream over opposite faces of a ring of canted stator vanes, mounted within the mixing chamber, wherein the conditioned air is directed over an outside face of the stator vanes and the used air is directed over the inside face of the stator vanes, whereupon the fresh and used airstreams meet at the tail ends of the vanes, corkscrew together and flow outwardly toward an interior wall of the mixing chamber, causing a cyclone effect that throws remaining coalesced moisture in the airstreams toward the interior wall;

e. collecting and removing the moisture from the mixing chamber; and f. passing the now dehumidified, joined airstreams onto the cabin.

9. The method of claim 8 wherein the conditioned fresh air initially enters the cold-air ducts at below freezing temperature.

10. The method of claim 8 wherein the stator ring is centrally mounted inside an inlet to the mixing chamber.

* * * * *